May 26, 1970 C. W. CHAMBERS, JR 3,514,544

PARTY LINE PRIVACY DEVICE

Filed April 21, 1967 4 Sheets-Sheet 1

INVENTOR
C. WILLIAM CHAMBERS, JR.

BY William W. Stokes

ATTORNEY

INVENTOR
C. WILLIAM CHAMBERS, JR.

BY William W. Stokes
ATTORNEY

INVENTOR
C. WILLIAM CHAMBERS, JR.

BY William D. Stokes

ATTORNEY

INVENTOR
C. WILLIAM CHAMBERS, JR.

BY William W. Stokes

ATTORNEY

United States Patent Office 3,514,544

Patented May 26, 1970

3,514,544
PARTY LINE PRIVACY DEVICE

Charles W. Chambers, Jr., 3204 81st Ave.,
Hyattsville, Md. 20785

Filed Apr. 21, 1967, Ser. No. 632,603
Int. Cl. H04m 1/00
U.S. Cl. 179—17 8 Claims

ABSTRACT OF THE DISCLOSURE

This invention uses a silicon controlled rectifier (SCR) to control the use of a party line telephone. Each party line system includes an SCR that is triggered to allow the passage of current to individual telephones when the party line is not in use. When one of the party lines is in use the SCR's on the other lines cannot be triggered thereby preventing the use of the other telephones and precluding eavesdropping.

BACKGROUND OF THE INVENTION

This invention is directed to telephone systems and more particularly to an apparatus for preventing other party line telephones from being used when one party line telephone is in use to preclude eavesdropping by the other party line subscribers.

Because of a desire for privacy most subscribers of modern day telephone communications systems have private lines. Further, many of the older party lines are being replaced by private lines. However, private lines are more expensive than party lines. The individual outside plant line costs as well as the additional switching system's relative costs increase the cost to the consumer. In many situations this increased consumer cost is unjustified becaue many subscribers' telephone lines are only used a very small portion of the available time. That is, a subscriber may only use his telephone less than one hour out of a twenty-four hour period, for example. Hence, a major reason for the rise in private lines as opposed to party lines is not the need for the better access of a private line, it is because of the privacy provided by a private line. That is, most party lines are subject to eavesdropping by the party line subscribers. Hence, many consumers have been willing to go the additional expense of having a private line as opposed to having a party line even though the party line would provide them with a sufficient amount of telephone time for their normal use.

Therefore, it is desirable to provide a system that maintains privacy on a telephone party line.

The prior art has recognized the problem of maintaining privacy on a party line and has made various attempts to solve this problem. However, the prior art devices have been found unsatisfactory because the majority of them use complicated switching arrangements. Further, these complicated switching arrangements incorporate relays that require regular routine maintenance, such as cleaning, contact adjustment and other maintenance. Moreover, the use of relay devices increases the resistance of the telephone line or provides a potential source of noise when connected to ground. In addition, prior art devices require either a special telephone or a rewiring of a conventional telephone, hence, they are either expensive or difficult to install.

Moreover, prior art systems that provide privacy to a party line subscriber fail to provide convenience for telephone calls made between parties on the same line. That is, when one party line subscriber desires to telephone another party line subscriber that is connected to the same line he must dial the other party line subscriber's number and then hang up. After the other subscriber answers the telephone he must then pick his up. However, if the other subscriber has answered and hung up before the calling subscriber re-picks up this telephone the call is lost. Hence, this operation is like a game of chance and it is desirable to provide a system for indicating to the calling subscriber when the answering subscriber has answered the telephone. Finally, prior art systems have failed to provide a means whereby a party line subscriber can override the privacy maintaining device when an emergency occurs. Specifically, in many states the law requires that other party line subscriber free a line when one of the subscribers has an emergency. Prior art systems that provide for line privacy have failed to provide a means for overriding the system providing the privacy so that when an emergency occurs a subscriber can signal the other subscribers to free the line.

Therefore, it is an object of this invention to provide a new and improved apparatus for use in a party line telephone system to provide privacy to the individual subscribers.

It is also an object of this invention to provide a new and improved apparatus that is simple and uncomplicated and provides privacy to party line subscribers of a telephone conversation system while providing a means for overriding a conversation when an emergency occurs.

It is another object of this invention to provide a new and improved apparatus for insuring privacy to party line subscribers of a telephone system while improving the ease of intra-communication between subscribers.

It is a further object of this invention to provide a new and improved apparatus for insuring privacy to party line subscribers that is simple and uncomplicated, and easy to attach to a common telephone.

It is a still further object of this invention to provide a new and improved apparatus to provide privacy to party line subscribers that does not add significant resistance to the party line, nor provide a potential noise source.

Another important object of this invention is the provision of an improved apparatus which provides privacy to party line subscribers that has low susceptance to noise interference.

SUMMARY OF THE INVENTION

In accordance with a principle of the invention each telephone on a party line has a separate electrical system to control the use of the telephone. Each system includes a unidirectional current flow means, a current flow control means, and a trigger means. The unidirectional current flow means is connected so as to cause a unidirectional current flow through the telephone. The current control means is connected between the unidirectional means and the telephone to control the passage of current through the telephone and the trigger means is connected to the current flow control means to trigger the current control means at desired periods but not at undesired periods. For example, the trigger means triggers the current flow control means when a subscriber desires to seize the party line and the party line is free, however, it does not trigger the current flow control means when the line is not free. Or, the trigger means triggers the current flow control means when an incoming telephone call occurs and the subscriber answers the telephone. Hence, the system allows individual telephone use but prevents eavesdropping.

In accordance with a further principle of the invention an indicator is provided for indicating when the party line is in use. Further, when a revertive telephone call (a phone call between subscribers on the same party line) is being made the indicator provides an indication when the telephoned subscriber answers the call.

In accordance with a still further principle of the invention a by-pass means is provided whereby a subscriber can inform other subscribers talking on the line that he has an emergency telephone call to make.

It will be appreciated that the invention is a simple device for imparting privacy to subscribers on a party line. A simple apparatus is provided for controlling the use of the telephones on a party line by allowing a telephone to be used when the line is not in use but preventing a telephone from being used when the line is in use. Further, the system provides a by-pass means for informing other subscribers that an emergency telephone call must be made. In addition, an indicator means is provided for determining both when the line is in use and for indicating when a called subscriber has answered a revertive telephone call.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
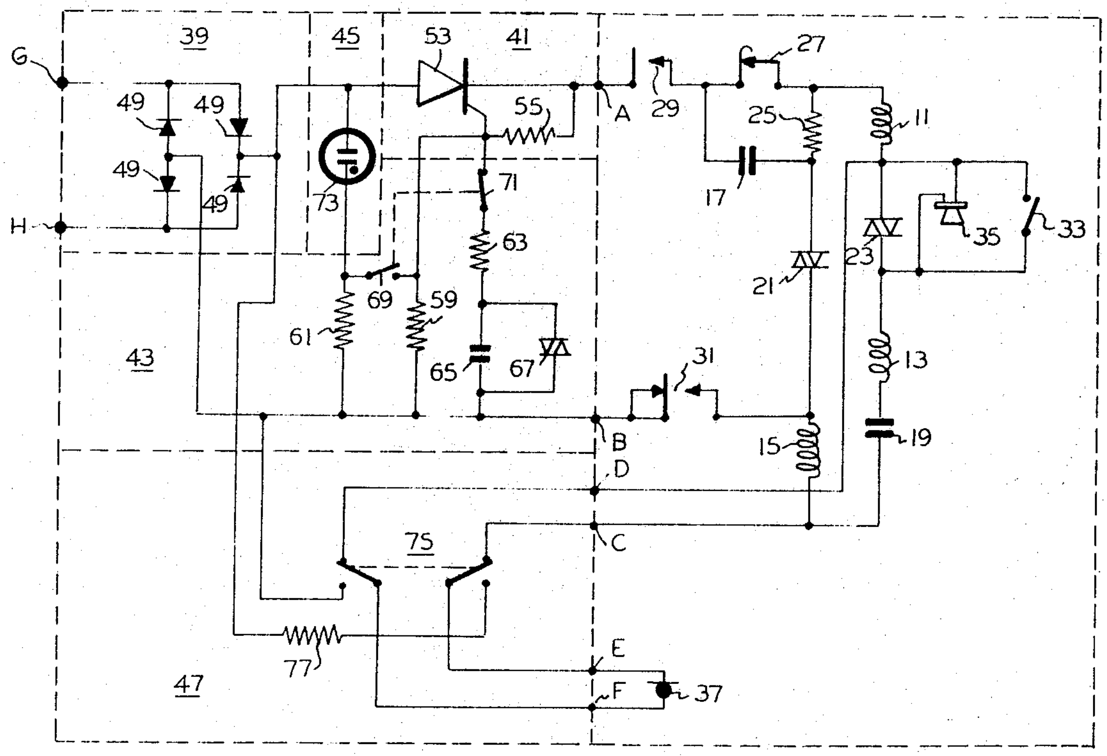
FIG. 1 is a schematic diagram illustrating one embodiment of the invention shown connected to a conventional central office battery-operated telephone.

Turning now to the drawings wherein like reference numerals designate like parts throughout the several views, FIG. 1 illustrates an embodiment of the invention connected to a conventional battery-operated telephone. Specifically, FIG. 1 is broken into a right section and a left section. The left section illustrates schematically an embodiment of the invention while the right section illustrates schematically a part of a conventional telephone.

The portion of the telephone illustrated on the right of FIG. 1 includes first, second, and third coils 11, 13, and 15, first and second capacitors 17 and 19, first and second varistors 21 and 23, a first resistor 25, a dial pulser 27, a pair of hook switch contacts 29 and 31, a receiver dial switch 33, a receiver 35, and a transmitter 37. The conventional incoming signal terminals are designated A and B in FIG. 1.

One hook switch contact 29 is connected in series with the dial pulser between terminal A and one end of the first coil 11. The other end of the first coil 11 is connected to one end of the second varistor 23. The other end of the second varistor 23 is connected to one end of the second coil 13 and the other end of the second coil 13 is connected to one end of the second capacitor 19. The other end of the second capacitor 19, which is normally connected to one terminal of the transmitter 37, is illustrated as connected to a terminal C.

Connected in parallel with the dial pulser 27 is a series circuit comprising the first capacitor 17 and the first resistor 25. The junction between the first capacitor and the first resistor is connected to one end of the first varistor 21. The other end of the first varistor is connected through the second hook switch contact 31 to the terminal B.

The junction between the first varistor diode 21 and the second hook switch contact 31 is connected to one end of the third coil 15. The other end of the third coil 15 is connected to terminal C.

The junction between the first coil 11 and the second varistor 23 is normally connected to the other terminal of the transmitter 37 but is illustrated in the FIG. 1 as connected to a fourth terminal D. A receiver 35 is connected in parallel with the second varistor 23 and the receiver dial switch 33 is connected in parallel with the receiver 35. The transmitter 37 is illustrated as connected to fifth and sixth terminals E and F.

It will be appreciated by those skilled in the art and others that with the exception of the break in the transmitter connection terminals the portion of FIG. 1 illustrated on the right is a schematic diagram of a telephone that has been somewhat simplified, for illustrative purposes only.

One embodiment of the party line privacy device of the invention is illustrated on the left of FIG. 1 and generally comprises a unidirectional current flow means 39, a current flow control means 41, a trigger means 43, an indicator means 45, and a by-pass means 47.

The unidirectional current flow means 39 comprises four diodes 49 connected in a bridge configuration. The input to the bridge is also connected to a pair of input terminals designated G and H.

The current flow control means comprises a silicon controlled rectifier (SCR) 53 and a first resistor 55. The first resistor is connected between the gate and cathode terminals of the SCR. The cathode terminal of the SCR is also connected to terminal A and the anode terminal of the SCR is connected to one output of the diode bridge. The diodes of the diode bridge are poled so that the incoming signal at the G and H terminals will flow through the SCR when the SCR is triggered on.

The trigger means 43 comprises second, third, and fourth resistors 59, 61, and 63, a first capacitor 65, and a first varistor 67. In addition, the trigger means includes first and second switches 69 and 71. Switches 69 and 71 co-act together, however, when one is open the other is closed. Preferably the first and second switches are operated by a button with a spring release wherein when the button is pushed the first switch 69 closes and the second switch 71 opens and when the button is released the first switch opens and the second switch closes. The second resistor 59 is connected in series between the gate of the SCR and the second output terminal of the diode bridge. The first switch 69 is connected in series with the third resistor 61 and the series combination is connected in parallel with the second resistor 59. Also connected in parallel with the second resistor 59 is the series connected second switch 71, fourth resistor 63, and first capacitor 65. Connected in parallel with the first capacitor 65 is the first varistor 67. The junction between the second resistor 59 and the first capacitor 65 is connected to terminal B.

The indicator means comprises a neon tube 73. The neon tube 73 is connected between the anode of the SCR and the junction between the first switch and the third resistor 61.

The by-pass means 47 comprises a double-pole, double-throw switch 75 and a fifth resistor 77. One complementary set of terminals of the double-pole, double-throw switch is connected to terminals D and C hereinabove described, and the common terminals of the switch are connected to terminals E and F also hereinabove described. One terminal of the other set of complementary terminals is connected to one output of the diode bridge and the other terminal is connected through the fifth resistor 77 to the second output side of the diode bridge.

It will be appreciated from the above described connections that the unidirectional current flow means 39, the indicator means 45, the current flow control means 41, and the trigger means 43 are merely connected between the telephone input line at terminals G and H and the telephone input terminals at terminals A and B. The by-pass means 47 is essentially connected between the transmitter 37 and its normal interior connection. In both situations the connections are at pairs of terminals so that the insertion of the invention into a telephone merely requires disabling these terminals and coupling them to the party line privacy system. Hence, the invention is easily connected to a conventional telephone system.

Turning now to a description of the operation of the embodiment of the invention illustrated in FIG. 1; normally, the SCR 53 prevents the passage of a signal because its anode-cathode circuit is open. That is, when the telephone handset is on hook the contacts 29 and 31 are open. Because the SCR is "off," each telephone only draws a small amount of current. That is, the only part of the circuit connected across the input terminals is the neon tube 73 in series with the third resistor 61 and this series combination only draws a small current, however, the voltage is large enough to maintain the neon tube in its ignited state. This small current is low enough to be relatively undetected by the central office switching equipment, hence, it does not have an undesirable effect on the office equipment.

Because the neon light is ignited it provides an indication to each subscriber that the telephone line is free. Hence, all a subscriber has to do it look at the indicator light to determine if he can "seize" the line.

When a subscriber desires to seize an idle line he must lift the handset and momentarily push the button that operates the first and second switches for this embodiment of the invention. Pushing the button closes switch 69 and opens switch 71, and lifting the handset closes contacts 29 and 31. This dual operation can be performed in either order. When the hook switch contacts 29 and 31 close, the anode-cathode circuit of the SCR is completed. Further, when switch 69 closes and switch 71 opens, the voltage across the third resistor 61 is applied to the gate of the SCR. This voltage triggers the SCR into its "on" state to allow current to pass through the telephone. Hence, the subscriber has seized the line and he can dial his desired number in a conventional manner.

When a subscriber seizes a line the neon indicator lights of the remaining subscribers' telephones turn off because the seized telephone draws a large amount of current. And, this large current reduces the voltage drop across the indicator lights of the unseized telephones to a point where they cannot be maintained on. Because the neon lamp turns off and because such a device is, by nature, an "off-on" conducting element responsive to available voltage, the current through the third resistor 61 goes to zero and no trigger voltage is applied to the gates of the SCR's on the other telephones. That is, if a second telephone's receiver is lifted and switches 69 and 71 operated, the SCR of the second telephone is not triggered. Because it is not triggered the second telephone cannot seize the line nor can the second telephone eavesdrop on the first telephone. Hence, the invention provides a system for preventing eavesdropping. The turning off of the neon lights also tells the other subscribers that the telephone line has been seized.

After the line has been seized the subscriber can release the push button that operates the first and second switches 69 and 71 because once an SCR is triggered it remains on even though its gate voltage is removed. It will remain on until its anode-cathode circuit is either opened or reverse biased with trigger current removed. In the instant environment, the anode-cathode is open circuited when the handset is replaced on the telephone since contacts 29 and 31 are opened.

It will be observed from a review of FIG. 1 that there is a second opening in the anode-cathode circuit of the SCR. This opening occurs when the dial contacts 27 open during dialing, hence, dialing would turn "off" the SCR if a means were not provided for maintaining it "on" during dialing. This is provided for by the first capacitor 65 in conjunction with the first varistor 67. That is, the SCR is initially turned on by closure of the first switch 69. Thereafter, when the first switch is opened and the second switch 71 is closed by releasing their common push button, a charging voltage is applied to the first capacitor 65 when the SCR is on. It is this voltage that retriggers the SCR "on" during dialing by discharging into the SCR's gate on each dial pulse reclosure. Alternatively, if the subscriber does not release the push button prior to dialing, the line is reseized after each dial pulse in the manner that it was initially seized. That is, the voltage drop across the third resistor 61 refires the SCR each time it burns off because the first switch 69 is closed.

After the subscriber hangs up at the end of a conversation the voltage charge on the first capacitor 65 immediately dissipates through the first varistor 67 and the series combination of the second and fourth resistors 63 and 59 in order to prevent reseizure of the line by the charge on the capacitor. Specifically, if the charge on the first capacitor were not immediately dissipated, a line could be reseized when "busy" through the capacitor's gating operation by merely picking up the telephone handset to the end that eavesdropping could occur. Rapid immediate discharge of the capacitor occurs except when switch 71 is held open by the subscriber. By opening switch 71 rapid discharge of the capacitor 65 is prevented. When switch 71 is open the capacitor can only discharge thru the varistor 67. The discharge time is controlled for a sufficient period of time to permit revertive calls as hereinafter described.

It will be appreciated by those skilled in the art that during dialing the neon lights of all of the subscribers' telephones will flash at the dialing pulse rate because the SCR of the used telephone is retriggered after each dial pulse occurs, hence, the neon lights are ignited during the SCR's off periods. The flashing tells the other subscribers that a person has seized the line and is dialing. Therefore, three light conditions can occur: an ignited light to indicate a free line; an unignited light to indicate a seized line; and a flashing light to indicate that a subscriber is dialing. In addition, the light will flash whenever the line current fluctuates because of the ringing current.

Seizure of the line to answer a calling party is accomplished in the same manner as seizure of the line in order to make a call. That is, the handset is lifted and the switch contacts 69 and 71 are momentarily closed and opened respectively. This fires the SCR and places a subscriber's telephone on the line so that he can answer the call.

In addition to preventing eavesdropping and indicating when the line has been seized, the invention aids in making revertive telephone calls. That is, it aids in making a telephone call between subscribers on the same party line. Specifically, to make a revertive telephone call the line is seized in the manner described above. The calling party then dials the other subscriber's number. Thereafter, the push button switch operating contacts 69 and 71 is held down and the handset is returned to its cradle. The subscriber then watches the neon light as the other subscriber's telephone rings—it will show the ringing current by the light brightening and/or flashing while ringing. As soon as the other party picks up the handset to answer the call the indicator light 73 will go out. The subscriber then takes his handset off the hook and releases the push button switch, and his party is on the line.

As described hereinafter, when the push button is held down the charged capacitor 65 can only discharge thru varistor 67. This is a sufficient period of time to permit the calling party to answer. Release of the push button with the handset off hook permits the voltage on the capacitor 65 to fire the SCR even though insufficient voltage is available to turn on the neon light. This latter condition prevents unwanted line seizure by other subscribers. In this manner, the invention aids revertive telephone calls. That is, rather than dialing another subscriber's number, hanging up the telephone, waiting a short period of time and picking up the telephone hoping the other subscriber is on the line, an indication of exactly when the other subscriber answers the telephone is provided.

The by-pass means 47 illustrated in FIG. 1 connects the transmitter 37 directly across the line so that it can transmit in an emergency. That is, when the switch 75 is in its upper position, as illustrated in FIG. 1, the transmitter is connected on the telephone side of the party line privacy system. This prevents the transmitter from transmitting when the line has been seized by another subscriber because as described above the SCR cannot be triggered. However, in some situations it is necessary that a subscriber be able to send an emergency message. When the switch 75 is switched to its lower position the transmitter is connected to the line side of the party line privacy system thereby by-passing the SCR. Thus, the transmitter can transmit even though the line has been seized. In this emergency situation, the transmitting person tells the people who are using the line that he desires to transmit an emergency message. Since the receiver is still on the telephone side of the system, he is not able to hear their response, however, when they free the line his neon lamp lights to indicate a free line. Thereafter, he can seize the line and make his emergency telephone call in the manner described above.

The embodiments of the invention illustrated in FIGS. 2–8 are identical to the embodiment of the invention illustrated in FIG. 1 with respect to the unidirectional current flow means 39, the current flow control means 41, and the by-pass means 47. Hence, these means will not be described except where different connections are made to them. However, the trigger means 43 and the location of the indicator means are changed, hence, the majority of the description will be directed to these changes and how these changes effect the operation of the system.

Figure 2:
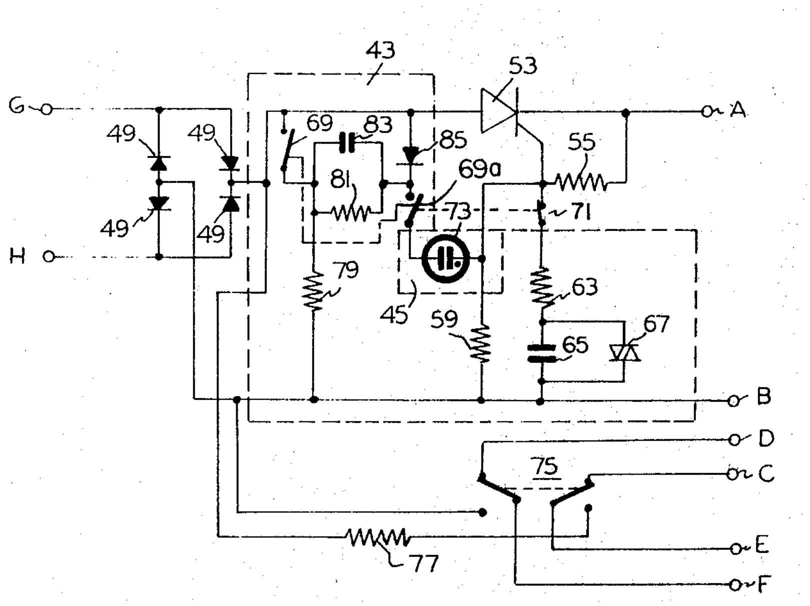
FIGS. 2–8 are schematic diagrams of alternate embodiments of the invention suitable for use in various environments.

In most telephone systems the line voltage is insufficient to ignite a neon lamp. Hence, the system illustrated in FIG. 1 would not operate to provide an indication when the line is free and when it is not free. The embodiment of the invention illustrated in FIG. 2 is adapted to operate in this environment. That is, as hereinafter described, the neon light 73 will indicate whether the line is or is not being used, however, it must be switched into the circuit each time it is desired to check the line.

The trigger means illustrated in FIG. 2 comprises the second resistor 59, the fourth resistor 63, the first capacitor 65, and the first varistor 67. In addition, the trigger means illustrated in FIG. 2 comprises a sixth resistor 79, a seventh resistor 81, a second capacitor 83, and a first diode 85. Further, the trigger means includes the first and second switches 69 and **69*a* and a third switch 71. These switches co-act together. That is when first and second switches 69 and 69*a* are open, the third switch 71** is closed and vice versa. As with FIG. 1, the switches are preferably operated by a momentary push button.

The anode of the SCR 53 is connected to the anode of the first diode 85 and the cathode of the first diode is connected to one end of the parallel combination of the seventh resistor 81 and the second capacitor 83 to the other end of the paralleled seventh resistor 81 and second capacitor 83 is connected through the first switch 69 to the anode of the SCR. The cathode of the first diode 85 is also connected through the second switch **69*a* to one side of the neon light 73. The other side of the neon light is connected to the gate of the SCR. The gate of the SCR is also connected through the series connected third switch 71, fourth resistor 63 and first capacitor 65, to one output of the bridge diodes. Connected in parallel with the third switch 71, fourth resistor 63, and first capacitor 65 is the second resistor 59. Further, connected in parallel with the first capacitor 65 is the first varistor 67. Connected between point B and the junction between the first switch 69 and the paralleled seventh resistor 81 and second capacitor 83 is the sixth resistor 79**.

In general, the embodiment of the invention illustrated in FIG. 2 operates the same as the embodiment illustrated in FIG. 1. That is, the SCR is untriggered until the telephone handset is lifted and the push button switch is momentarily operated. And, the triggering only occurs if the line is idle when the handle is lifted and the switch is operated. One difference between the embodiments illustrated in FIGS. 1 and 2 is that the neon light as connected in FIG. 2 is not on when the line is idle. It only comes on when the first and second switch contacts 69 and **69*a* are closed. The latter action doubles the line voltage across the neon light. This system can therefore operate at a lower line voltage than the system illustrated in FIG. 1. Further, the second capacitor 83 charges near to the line voltage during the idle condition. Operating switch 69 places the second capacitor 83 in series with the line voltage to double the voltage across the neon light 73 as switch 69*a* is being closed. This voltage fires the neon light 73 and the SCR 53** is turned on in the same manner as in the embodiment illustrated in FIG. 1.

Therefore, to operate FIG. 2, the first and second switches 69 and **69*a* must be closed first; if the line is idle the neon light 73 ignites. Thereafter, the telephone handset is lifted and the voltage drop across the second resistor 59 triggers the SCR on to place the subscriber on the line. Following this, the subscriber can dial the desired number and capacitor 65 retriggers the SCR on after each dial pulser reclosure in the same manner as discussed with regard to FIG. 1. Eavesdropping is prevented because the first capacitor 65 cannot charge to a triggering voltage with the SCR off nor can the light be ignited after the line has been seized by another subscriber to trigger the SCR on. Moreover, the first capacitor 65 discharges immediately after line use through the path consisting of the resistor combination 63 and 59 and the parallel varistor 67** in the same manner as described with respect to the embodiment shown in FIG. 1. A revertive telephone call is aided in the same manner as described with respect to the embodiment of FIG. 1.

The embodiment of the invention illustrated in FIG. 2 will not automatically provide line monitoring, e.g., idle, busy, ringing and dialing of a telephone call unless first and second switches are maintained operated. In order to accomplish such, the pushbutton must be held closed. Because it is desirable to provide a low voltage system whereby ringing and dialing are automatically monitored, the circuit illustrated in FIG. 3 is provided.

Figure 3:
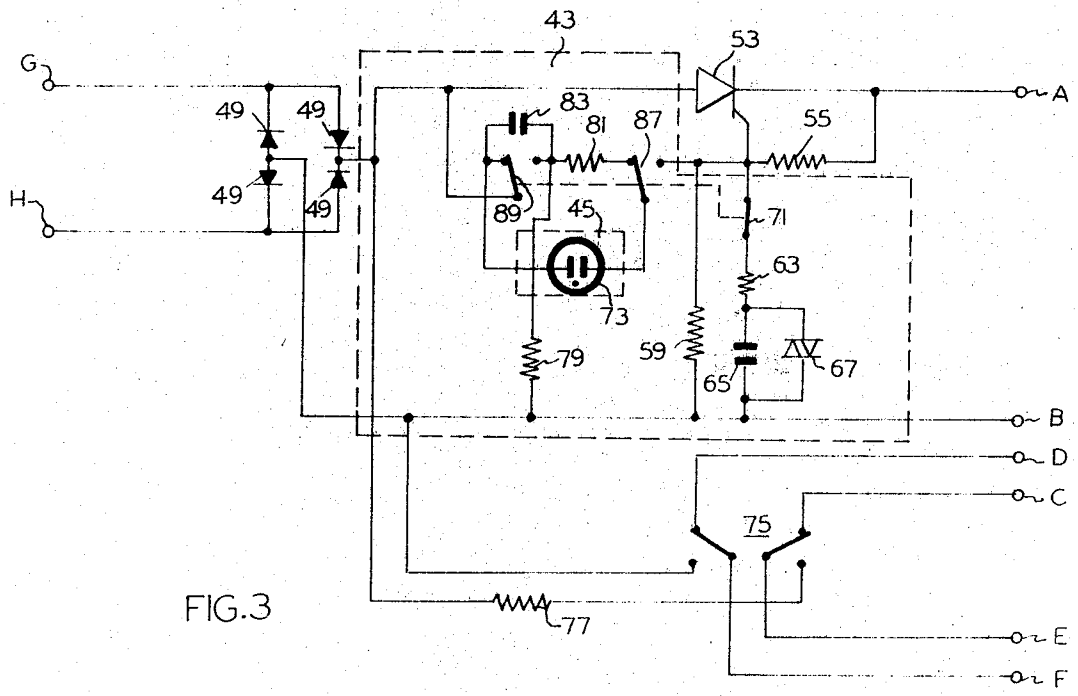

The trigger means illustrated in FIG. 3 comprises the second resistor 59, the fourth resistor 63, the first capacitor 65, the first varistor 67, the sixth resistor 79, the seventh resistor 81, and the second capacitor 83. In addition, the trigger means of FIG. 3 includes the second switch 71, a fourth switch 87 and a fifth switch 89. The fourth and fifth switches are single-pole, double-throw switches while the second switch is a simple open-close switch, however, all three switches co-act together. Specifically, when the fourth and fifth switches connect their common terminals to their left terminals, as viewed in FIG. 3, the second switch is closed and when the fourth and fifth switches connect their common terminals to their right terminals the second switch is open. As with FIGS. 1 and 2, the switches are operated by a push button.

Turning now to the component connections of the embodiment illustrated in FIG. 3, the anode of SCR 53 is connected to the common contact of the fifth switch 89. The second capacitor 83, and the sixth resistor 79 are connected in series between the left terminal of the fifth switch 89 and the second output of the diode bridge. The junction between the second capacitor 83 and the sixth resistor 79 is connected to the right terminal of the fifth switch 89. The right terminal of the fifth switch 89 is connected to the seventh resistor 81 which is also connected to the left terminal of the fourth switch 87. The right terminal of the fourth switch 87 is connected to the gate of the SCR and the common terminal of the fourth switch 87 is connected to the neon lamp 73 which is also connected to the left terminal of the fifth switch 89.

The gate of the SCR is connected through the series combination of the second switch 71, the fourth resistor 63, and the first capacitor 65 to the anode side of the diode bridge. The third resistor 59 is also connected between the gate of the SCR 53 and the anode side of the diode bridge. Further, connected in parallel with the first capacitor 65 is the first varistor 67.

The embodiment of the invention illustrated in FIG. 3 generally operates in a manner similar to the embodiment illustrated in FIG. 2. Specifically, the second capacitor 83 is charged to near line potential when the switches are connected to their left terminals. This voltage is insufficient to ignite the neon lamp. When the switches 89 and 87 are connected to their right terminals the capacitor charge adds to the line voltage and ignites the neon lamp if the line is idle. The resulting voltage drop across second resistor 59 fires the SCR. If the line is not idle the combined voltages are insufficient to ignite the neon lamp and fire the SCR.

The system illustrated in FIG. 3 permits the neon light to ignite during ringing and dialing even though the button switch is not pressed. This occurs because the ringing pulses are applied to the neon lamp which is connected across the line when the switches are to the left as well as to the right. Hence, the system prevents inadvertent pickup by subscribers during the ringing cycle as the ringing voltage is sufficient to ignite the light which is now always across the line. It will further be appreciated that the light will now automatically ignite during dialing. The other operative features of FIG. 3 are identical to those discussed with respect to FIG. 2.

Figure 4:
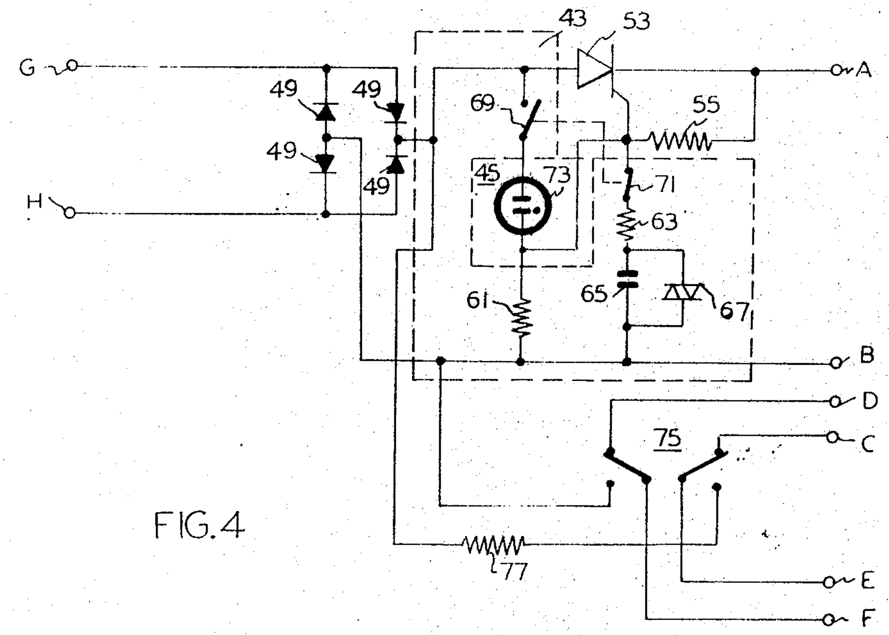

FIG. 4 is generally similar to FIG. 2 but is suitable for use on a party line where the line voltage is sufficient to ignite the neon tube. However, the embodiment of the invention illustrated in FIG. 4 utilizes less components than the embodiment of the invention illustrated in FIG. 2. Specifically, FIG. 4's trigger circuit includes the third resistor 61, the fourth resistor 63, the first capacitor 65, the first varistor 67. In addition, the embodiment of the invention illustrated in FIG. 4 includes the first and second switches 69 and 71.

The anode of the SCR is connected through the series connected first switch 69, neon light 73, third resistor 61, to the second output of the diode branch. The junction between the neon lamp and the third resistor 61 is connected to the gate of the SCR. Connected in parallel with the third resistor 61 is the series connected second switch 71, fourth resistor 63, and first capacitor 65. Connected in parallel with the first capacitor 65 is the first varistor 67.

Preferably, the embodiment of the invention illustrated in FIG. 4 has an extinguished neon lamp until the subscriber closes the switch 69 by the operation of a button. When the switch 69 is closed, switch 71 opens and the neon lamp lights if the line is idle, and the resulting voltage drop across resistor 61 fires the SCR. Thereafter, the subscriber can dial a telephone number in the manner hereinabove described. The embodiment of FIG. 4 does not require voltage doubling across the neon light, as this embodiment is of particular use on lines which have sufficient voltage to ignite the light.

Figures 5, 6:
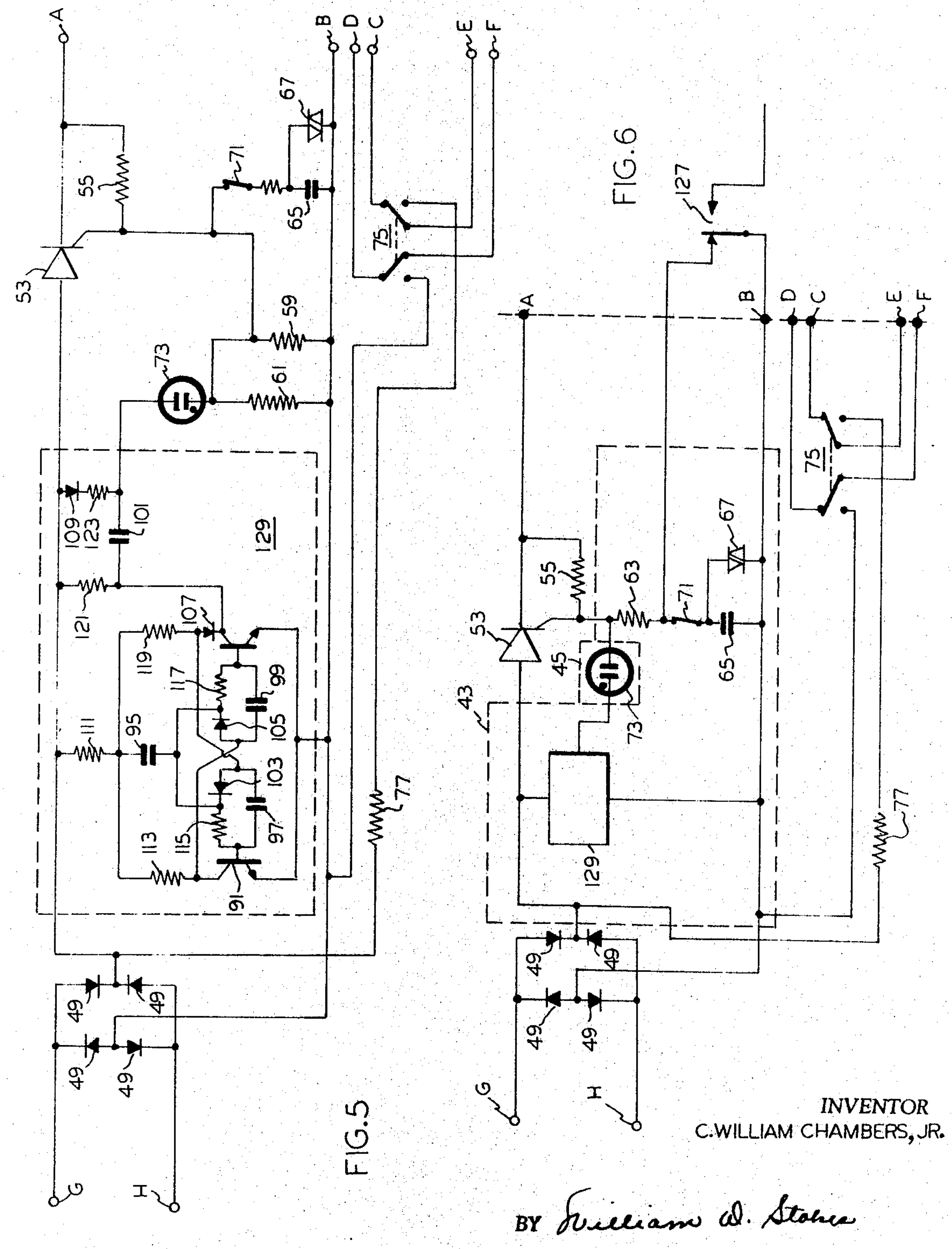

It is desirable to have the light on continuously even when the maximum line voltage is insufficient to turn the light on. FIG. 5 illustrates an embodiment of the invention wherein an amplifier 129 doubles the voltages at a periodic rate whereby continuous monitoring of the line is provided during the idle, ringing and dialing conditions. FIG. 5 also illustrates how the line may be seized when idle by merely lifting the handset. The embodiment of the invention illustrated in FIG. 5 with respect to the trigger means, the current flow control means, the unidirectional current flow means, the indicator means, and the by-pass means is similar to the embodiment of the invention illustrated in FIG. 1, hence, only the amplifier 129 and its connection into the system is hereinafter described and discussed. The trigger means is automatic and occurs whenever the light is ignited and the handset is lifted. This occurs by means of the voltage drop across the second resistor 61.

The amplifier 129 of the embodiment of the invention illustrated in FIG. 5 comprises first and second NPN transistors 91 and 93; third, fourth, fifth, and sixth capacitors 95, 97, 99, and 101; second, third, fourth, and fifth diodes 103, 105, 107, and 109; and eighth, ninth, tenth, eleventh, twelfth, thirteenth, and fourteenth resistors 111, 113, 115, 117, 119, 121, and 123.

The emitters of the two NPN transistors 91 and 93 are connected together and to the junction between the anode side of the diode bridge and the third resistors 61. The base of the second transistor 93 is connected through the fifth capacitor 99 to the collector of the first transistor 91. Connected in parallel with the fifth capacitor 99 is the series connected third diode 105 and eleventh resistor 117 with the anode of the diode connected to the collector of the first transistor. The collector of the first transistor 91 is also connected through the series connected eighth and ninth resistors 111 and 113 to the anode of the SCR 53. The junction between the eighth and ninth resistors is connected through the series connected twelfth resistor 119 and fourth diode 107 to the collector of the second NPN transistor 93 with the cathode of the diode connected to said collector. The base of the first transistor 91 is connected through the fourth capacitor 97 to the junction between the twelfth resistor 119 and the fourth diode 107. Connected in parallel with the fourth capacitor 97 is the series connected second diode 102 and tenth resistor 115. The anode of the second diode is connected to the collector of the second transistor. The junction between the second diode 103 and the tenth resistor 115 is connected directly to the junction between the third diode 105 and the eleventh resistor 117. In addition, this interconnection is connected through the third capacitor 95 to the junction between the eighth resistor 111 and the ninth resistor 113.

The collector of the second transistor 93 is also connected through the thirteenth resistor 121 to the anode of the SCR 53. Connected in parallel with the thirteenth resistor 121 is the series connected fifth diode 109, fourteenth resistor 123, the sixth capacitor 101. The junction between the sixth capacitor 101 and the fourteenth resistor 123 is connected to one side of the neon lamp 73.

The amplifier as hereinabove described is a multi-vibrator amplifier that applies an igniting voltage to the neon lamp when the line is idle and does not apply an igniting voltage to the neon lamp when the line is not idle. That is, depending upon the value of the line voltage, it switches to one or the other of its two states when the line is not idle and switches freely when the line is idle.

The FIG. 6 embodiment of the invention is substantially similar to FIG. 5 and also eliminates a portion of the trigger circuit as described with respect to FIG. 1. Specifically, the FIG. 6 embodiment eliminates the first switch 69 as well as the second and third resistors 59 and 61 by making an internal connection to one of the telephone handset contacts having a closed position when the handset is in its cradle. More specifiually, the side of the neon tube not connected to the amplifier of FIG. 5 is illustrated in FIG. 6 as connected to the gate of the SCR. The gate of the SCR is connected through the series connected fourth resistor 63, second switch 71, and first capacitor 65 to the second side of the diode bridge. Connected in parallel with the first capacitor 65 is the first varistor 67. In addition, the junction between the fourth resistor 63 and the second switch 71 is connected to the side of the telephone handle having a normally closed pair of contacts indicated at 127 during the on hook condition. It will be appreciated that while this embodiment of the invention has the economic advantage of eliminating a pair of resistors it does require an additional interior connection to the telephone. That is, the normally closed contacts illustrated at 127 provide the function of the switch 69 illustrated in FIG. 1 and the resistors illustrated in FIG. 5 described above.

Figure 7:
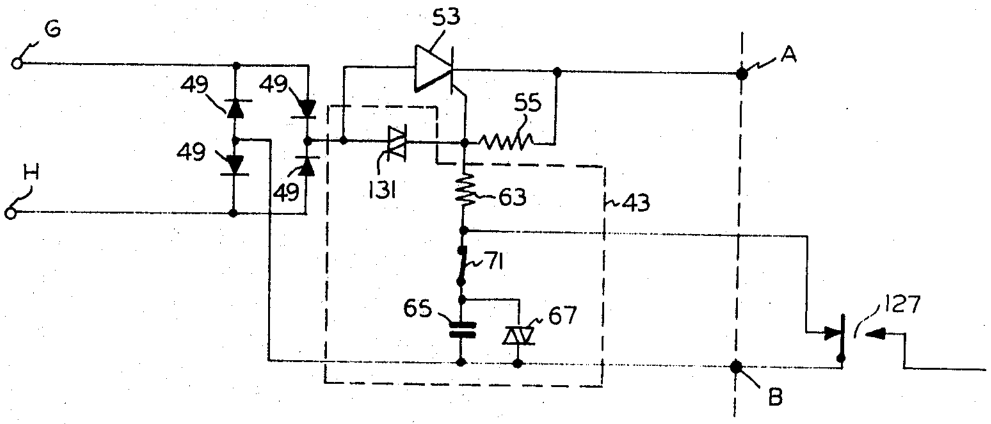

The FIG. 7 embodiment of the invention is suitable for use in environments where it is desirable to eliminate the lamp entirely as an indicating means and provide a very simple and cheap system having the minimum number of components, and still provide for revertive telephone calls and secrecy of conversation. FIG. 7 is similar to FIG. 6 with the elimination of both the amplifier and the neon lamp and the substitution of a second varistor 131 therefor. The second varistor is connected between the gate and the anode of the SCR 53; it permits firing of the SCR 53 when full line voltage occurs, i.e. an idle line. However, if the line is in use the voltage on the varistor diode is insufficient to fire the SCR thereby preventing eavesdropping. A revertive telephone call is made by dialing the desired number, i.e, opening switch 71, hanging up the telephone, waiting a short period of time and then picking up the telephone, closure of switch 71 then gets you back on the line. Hence, this embodiment only allows a revertive telephone call to be made, it does not aid a revertive telephone call in the manner hereinabove described.

Figure 8:
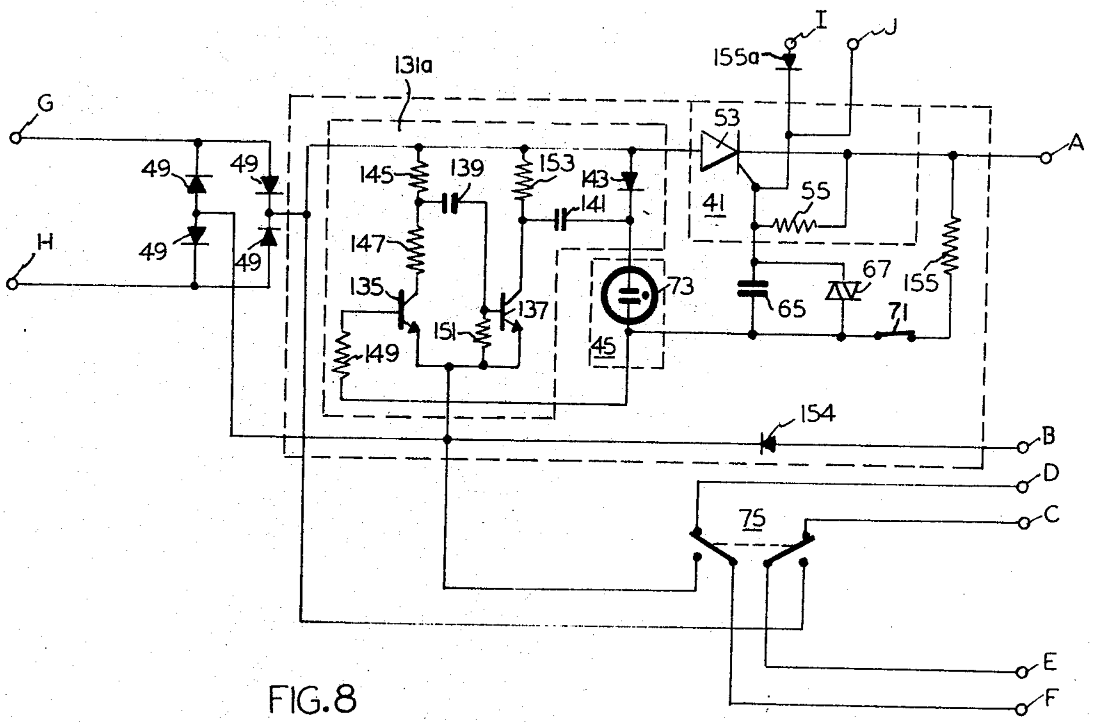

FIG. 8 is still another embodiment of the invention that includes an amplifier **131*a* that is different from the amplifier illustrated in FIG. 5. This embodiment also provides for line seizure in the idle condition without pressing a button, or in effect automatically. Further, the embodiment of the invention illustrated in FIG. 8 only uses one switch 71. Moreover, it has a neon lamp 73** that is on when the line is idle, and automatically monitors ringing, dialing, idling and busy.

The amplifier part **131*a* of the trigger means 43 of the embodiment illustrated in FIG. 8 comprises: third and fourth NPN transistors 135, and 137; seventh and eighth capacitors 139 and 141; a sixth diode 143; and fifteenth, sixteenth, seventeenth, eighteenth and nineteenth resistors 145, 147, 149, 151 and 153.**

The emitters of the third and fourth transistors 135 and 137 are connected together and to the second side of the diode bridge. The other side of the diode bridge is connected through the series connected fifteenth and sixteenth resistors 145 and 147 to the collector of the third transistor 135. The junction between the fifteenth and sixteenth resistors 145 and 147 is connected through the series connected seventh capacitor 139 and eighteenth resistor 151 to the emitters of the third and fourth transistors 135 and 137. The junction between the seventh capacitor 139 and the nineteenth resistor 151 is connected to the base of the fourth transistor 137. The anode of the SCR is connected through the eleventh resistor 153 to the collector of the fourth transistor 137. The collector of the fourth transistor 137 is also connected through the eighth capacitor 141 to one side of the neon lamp 73. The anode of the SCR is also connected through the sixth diode 143 to the junction between the neon light 73 and the eighth capacitor 141 with the anode of the sixth diode connected to the anode of the SCR. The other side of the neon light 73 is connected through the seventeenth resistor 149 to the base of the third transistor 135.

It will be appreciated that the amplifier **131*a* as described above simply amplifies the incoming voltage signal and applies the amplified voltage to the neon lamp 73. If the line is idle, the amplified voltage is sufficient to light the lamp 73** and if the line has been seized the amplified voltage is insufficient to light the lamp.

To provide better line balancing by offsetting the SCR 53 resistance a diode 154 is connected between terminal B and the second terminal of the diode bridge.

In addition to the amplifier, the trigger circuit also includes the first capacitor 65 connected between the gate of the SCR and the junction between the neon lamp 73 and the seventeenth resistor 149. Connected in parallel with the first capacitor 65 is the first varistor 67. In addition, a twentieth resistor 155 is connected from the cathode of the SCR 53 in series with the switch 71 to the junction between the neon lamp 73 and the seventeenth resistor 149.

Turning now to the operation of FIG. 8, the amplifier **131*a*** merely amplifies the line voltage to a level that ignites the neon lamp if the line is idle. If the line is idle and it is desired to seize the line, all that must be done is to lift the handset. Lifting the handset completes the anode-cathode circuit of the SCR in the manner hereinabove described with respect to FIG. 1. The amplified voltage fires the SCR and allows the subscriber to dial.

To make a revertive phone call, all the subscriber must do is to lift the handset, dial the other subscriber's number, open switch contacts 71 by preferably pushing a pushbutton switch, and hang up the phone. The neon lamp will brighten and/or flash due to ringing current and go out when the other subscriber answers the telephone. Then the calling subscriber must lift the handset and release the pushbutton. Releasing the pushbutton allows the charge on the first capacitor 65 to fire the SCR and place the calling subscriber back on the line.

As with the embodiments discussed above, the FIG. 8 embodiment prevents eavesdropping by preventing the firing of the SCR when the line has been seized by another party. Specifically, the amplifier will not amplify the line voltage to a value sufficient to ignite the neon lamp, hence, an insufficient voltage is on the gate of the SCR. This insufficient voltage prevents the SCR from firing.

The embodiment of the invention illustrated in FIG. 8 also includes a seventh diode **155*a*.** This seventh diode has its cathode connected to the gate of the SCR and its anode connected to a terminal I. In addition, a wire is connected from the cathode of the seventh diode to a second terminal J. The diode and the wire are merely for use in connecting to extension telephones. That is, some subscriber's telephones may have extensions, these are connected to the embodiment illustrated in FIG. 8 at either terminals I and J. By this connection other phones can have simple privacy sets without the requirement of having a neon indicating light, for example. That is, the embodiment illustrated in FIG. 8 could be considered a master unit with slave units of less complexity. For example, the slave units could be of the complexity illustrated in FIG. 7. In this manner, the overall cost of providing a plurality of private line privacy devices to subscribers having extension telephones is reduced. In addition, FIG. 8 type circuits can provide extensions that have both line and household privacy or merely line privacy. It will be obvious to one skilled in the art that the diode can be replaced by a switch and that this will permit elimination of terminal J. Closing or opening of a connection between the gates of the SCR's within a unit permits line and unit privacy or just line privacy.

It will be appreciated from the foregoing that the invention is a simple apparatus for providing a party line privacy device. All that is required is the addition of a simple electronic circuit between the incoming lines to the telephone. A single privacy device can also be used for several phones within a common station. The item is installed by removing the line contacts and inserting the invention between the line contacts and several telephones connected in parallel.

It will be appreciated by those skilled in the art and others that the embodiments of the invention illustrated can be varied within the scope of the invention. Specifically, except for the FIG. 7 embodiment, all of the embodiments disclose a neon tube as an indicating light. However, this neon tube can be eliminated if the indicating feature is not desired. In this event another "off-on" conducting device such as the varistor of FIG. 7, must be substituted. Further, the invention in embodiments 1–6 and 8 disclose the use of a bypass means to provide for emrgency situations. However, it may be desirable to eliminate the bypass means to reduce the cost of the party line privacy device. Moreover, different types of amplifiers can be used. Hence, it will be obvious to those skilled in the art and others that the invention may be practiced otherwise than as specifically disclosed herein.

What is claimed is:

1. In a party line privacy device of the type adapted for connection to each of a plurality of subscriber telephone sets which sets include first and second incoming signal terminals, said sets being serviced by a party line, in combination, current flow control means of the type including power electrodes and at least one control electrode, means for connecting the power electrodes of said current flow control means in series, power flow controlling relationship between one side of the party line and the first of said incoming signal terminals, means for connecting the second incoming signal terminal to the other side of the party line, off-on conducting means, means for connecting said off-on conducting means in energizing relationship to the control electrode of said current flow control means when the party line is idle, means for connecting said off-on conducting means across said party line, capacitive means, means for connecting said capacitive means in charge-storing, energizing relationship to the control electrode of said current flow control means during revertive calls whereby the calling party may reseize the line and means for connecting said capacitive means between said first and second incoming signal terminals.

2. In a party line privacy device of the type adapted for connection to each of a plurality of subscriber telephone sets which sets include first and second incoming signal terminals, a transmitter and a receiver, said sets being serviced by a party line, in combination, current flow control means of the type including power electrodes and at least one control electrode, means for connecting the power electrodes of said current flow control means in series, power flow controlling relationship between one side of the party line, and the first of said incoming signal terminals, means for connecting the second incoming signal terminal to the other side of the party line, off-on conducting means, means for connecting said off-on conducting means in energizing relationship to the control electrode of said current flow control means, means for connecting said off-on conducting means across said party line, two position switch means, means for electrically connecting said transmitter, through said switch means to said receiver when said switch is in a first position and means for electrically connecting said transmitter across said party line through said switch when said switch is in a second position.

3. In a party line privacy device of the type adapted for connection to each of a plurality of subscriber telephone sets which sets include first and second incoming signal terminals, said sets being serviced by a party line, in combination, current flow control means of the type including power electrodes and at least one control electrode, means for connecting one power electrode of said current flow control means to the first incoming signal terminal, unidirectional current flow means, means for connecting said unidirectional current flow means between the other power electrode and each side of the party line, means for connecting said unidirectional current flow means between said second incoming signal terminal and each side of the party line, off-on conducting means, means for connecting said off-on conducting means in energizing relationship to the control electrode of said current flow control means when the party line is idle, means for connecting said off-on conducting means across said party line, capacitive means, means for connecting said capacitive means in charge-storing energizing relationship to the control electrode of said current flow control means during revertive calls whereby the calling party may reseize the line and means for connecting said capacitive means between said first and second incoming signal terminals.

4. In a party line privacy device of the type adapted for connection to each of a plurality of subscriber telephone sets which sets include first and second incoming signal terminals, said sets being serviced by a party line, in combination, current flow control means of the type including power electrodes and at least one control electrode, means for connecting the power electrodes of said current flow control means in series, power flow controlling relationship between one side of the party line and the first of said incoming signal terminals, means for connecting the second incoming signal terminal to the other side of the party line, off-on conducting means, means for connecting said off-on conducting means in energizing relationship to the control electrode of said current flow control means when the party line is idle, means for connecting said off-on conducting means across said party line, capactive means, means for connecting said capacitive means in charge-storing energizing relationship to the control electrode of said current flow control means during revertive calls whereby the calling party may reseize the line, means for connecting said capacitive means between said first and second incoming signal terminals, switch means, means for connecting said switch means in discharge current interrupting relationship with said capacitive means.

5. In a party line privacy device of the type adapted for connecting to each of a plurality of subscriber telephone sets which sets include first and second incoming signal terminals, said sets being serviced by a party line, in combination, current flow control means of the type including power electrodes and at least one control electrode, means for connecting the power electrodes of said current flow control means in series, power flow controlling relationship between one side of the party line and the first of said incoming signal terminals, means for connecting the second incoming signal terminals to the other side of the party line, off-on conducting means, means for connecting said off-on conducting means in energizing relationship to the control electrode of said current flow control means, means for connecting said off-on conducting means across said party line, said last named connecting means including a voltage increasing circuit, said voltage increasing circuit having capacitive means, means for connecting said capacitive means in charging relationship across said party line, and means for connecting said capacitive means and said party line in series aiding relationship across said off-on conducting means.

6. In a party line privacy device of the type adapted for connection to each of a plurality of subscriber telephone sets which sets include first and second incoming signal terminals, said sets being serviced by a party line, in combination, current flow control means of the type including power electrodes and at least one control electrode, means for connecting the power electrodes of said current flow control means in series, power flow controlling relationship between one side of the party line and the first of said incoming signal terminals, means for connectig the second incoming signal terminal to the other side of the party line, off-on conducting means, means for connecting said off-on conducting means in energizing relationship to a control electrode of said current flow control means, means for connecting said off-on conducting means across said party line, said last named connecting means including a voltage increasing circuit having capacitive means, switch means, means for connecting said capacitive means across said party line when said switch means is in a first position, means for serially connecting said capacitive means, one side of said party line, said off-on conducting means and the other side of said party line when said switch means is in a second position.

7. In a party line privacy device of the type adapted for connection to each of a plurality of subscriber telephone sets which sets include first and second incoming signal terminals, said sets being serviced by a party line, in combination, current flow control means of the type including power electrodes and at least one control electrode, means for connecting the power electrodes of said current flow control means in series, power flow controlling relationship between one side of the party line and the first of said incoming signal terminals, means for connecting the second incoming signal terminal to the other side of the party line, off-on conducting means, means for connecting said off-on conducting means in energizing relationship to a control electrode of said current flow control means, means for connecting said off-on conducting means across said party line, said last named connecting means including an amplifier for increasing the voltage applied across said off-on conducting means, means for connecting said party line in energizing relationship to said amplifier.

8. In a party line privacy device of the type adapted for connection to each of a plurality of subscriber telephone sets which sets include first and second incoming signal terminals, said sets being serviced by a party line, in combination, current flow control means including first and second power electrode means and control electrode means, means for connecting the first and second electrode means of said current flow control means, said party line and said incoming signal terminals in closed circuit relationship, off-on conducting means, means for connecting said off-on conducting means between said first power electrode means and said control electrode means of said current flow control means when the party line is idle, capacitive means, means for connecting said capacitive means in charge-storing energizing relationship to said current flow control means between said control electrode means and said second power electrode means during revertive calls whereby the calling party may reseize the line and means for connecting said capacitive means between said first and second incoming signal terminals.

References Cited

UNITED STATES PATENTS

| | | | |
|---|---|---|---|
| 2,180,963 | 11/1939 | Pearce | 179—17 |
| 3,035,123 | 5/1962 | Nomura | 179—17 |
| 3,155,776 | 11/1964 | Kano et al. | 179—17 |

KATHLEEN H. CLAFFY, Primary Examiner

J. S. BLACK, Assistant Examiner